United States Patent [19]

Das et al.

[11] Patent Number: 5,212,273

[45] Date of Patent: May 18, 1993

[54] CROSSLINKED POLYMERIC MICROPARTICLES; THEIR METHOD OF PREPARATION AND USE IN COATING COMPOSITIONS

[75] Inventors: Suryya K. Das, Pittsburgh; Soner Kilic, Gibsonia, both of Pa.

[73] Assignee: PPG Industries, Inc., Pittsburgh, Pa.

[21] Appl. No.: 718,065

[22] Filed: Jun. 20, 1991

[51] Int. Cl.$^5$ ............................................ C88F 20/10
[52] U.S. Cl. ................................. 526/323.1; 526/321; 526/322; 526/323; 526/336
[58] Field of Search ...................... 526/323.1, 321, 322, 526/323, 336

[56] References Cited

U.S. PATENT DOCUMENTS

| | | | |
|---|---|---|---|
| 4,220,679 | 9/1980 | Backhouse | 427/401 |
| 4,377,661 | 3/1983 | Wright et al. | 524/522 |
| 4,414,278 | 11/1983 | Cohen et al. | 428/403 |
| 4,477,536 | 10/1984 | Wright et al. | 428/522 |
| 4,563,372 | 1/1986 | Kurauchi et al. | 427/409 |
| 4,611,026 | 9/1986 | Olson et al. | 524/548 |
| 4,849,480 | 7/1989 | Antonelli et al. | 525/303 |

FOREIGN PATENT DOCUMENTS 153600 9/1985 European Pat. Off. .

Primary Examiner—Paul R. Michl
Assistant Examiner—John J. Guarriello
Attorney, Agent, or Firm—William J. Uhl

[57] ABSTRACT

Crosslinked polymeric microparticles obtained by polymerization of a mixture of polymerizable ethylenically unsaturated monomers being substantially free of monomers containing polar groups are disclosed. At least one of said monomers is a polyethylenically unsaturated crosslinking monomer free of oxyethylene groups and is present in amounts of 10 to 90 percent by weight based on total weight of said polymerizable ethylenically unsaturated monomers. The crosslinked polymeric microparticles are prepared by aqueous emulsion polymerization techniques in the absence of polyester emulsifier. The microparticles are separated from the aqueous polymerization medium and converted into organic medium by azeotropic distillation. The microparticles are useful in organic solvent-based high solids coating compositions and can be used in color coats, clear coats or composite color-clear coatings where the crosslinked polymeric microparticles can be contained in the color coat and/or in the clear coat. The crosslinked polymeric microparticles when present in additive amounts in such coating compositions improve the sag resistance and the metallic pigment pattern control of the coating and do not detract from the overall desirable properties of the coating.

15 Claims, No Drawings

CROSSLINKED POLYMERIC MICROPARTICLES; THEIR METHOD OF PREPARATION AND USE IN COATING COMPOSITIONS

BACKGROUND OF THE INVENTION

1. Field of the Invention

The present invention relates to crosslinked polymeric microparticles, their method of preparation and to their use in coating compositions.

2. Brief Description of the Prior Art

Crosslinked polymeric microparticles of various types are known in the prior art and offer a way of obtaining high solids compositions for use in coating applications. An advantage of using crosslinked polymeric microparticles in coatings is that they make possible a higher solids content than would otherwise be possible without causing an increase in viscosity. In addition, the crosslinked polymeric microparticles improve pigment orientation. For example, when aluminum flakes or metal oxide coated micas are present in the coating compositions, the crosslinked polymeric microparticles make the aluminum flakes and the metal oxide coated micas which have flake-like dimensions lie flat which is very difficult to do in high solids systems. Additionally, it has been found that the crosslinked polymeric microparticles give a high level of sag resistance in high solids coating compositions permitting the application of thicker coatings.

Crosslinked polymeric microparticles have been prepared by non-aqueous dispersion polymerization techniques. However, these procedures required the use of specific organic solvents, specific monomers and specific reaction sequences so as to prepare the crosslinked polymeric microparticles in a stably dispersed manner.

The prior art also discloses that the crosslinked polymeric microparticles can be prepared in aqueous medium. A description of prior art in this area is presented below.

PRIOR ART

U.S. Pat. No. 4,220,679 discloses multilayer coatings comprising a colored pigmented base coat composition and a clear top coat over the base coat. The base coat contains a film-forming polymer and a volatile organic liquid diluent in which the polymer is dissolved and also contains polymeric microparticles which are stabilized in the coating composition by means of a steric barrier around the particles of polymer chains which are solvated by the solution. It is mentioned in the reference that the polymer microparticles may be prepared by aqueous emulsion polymerization techniques and that some difunctional unsaturated compound may be included in the polymerizing monomers to give a crosslinked polymer. However, there is no suggestion in the reference of separating the crosslinked microparticles by azeotropic distillation techniques to form a non-aqueous dispersion and incorporating the non-aqueous dispersion with the organic solvent-based coating composition. Rather, the microparticles are disclosed as being separated from the aqueous medium by spray drying and then redispersed in the solution by methods employing high shear to the mixture. In addition, it is necessary that the microparticles be sterically stabilized which may be from association of the polar groups present in the film-forming polymer and in the microparticle, respectively. Another way to sterically stabilize the microparticles is to continue the emulsion polymerization with a second feed of monomers which does not include any difunctional material giving rise to a polymer which is compatible with the organic solution in which the crosslinked microparticles are dispersed.

U.S. Pat. Nos. 4,377,661 and 4,477,536 disclose crosslinked polymeric microparticles which are made by emulsion polymerization techniques of ethylenically unsaturated monomers including a monomer containing two or more double bonds per molecule. The crosslinked microparticles may be recovered from the aqueous medium by azeotropic distillation techniques and incorporated into organic solvent-based coating compositions. Both references, however, specifically teach the use of polar ethylenically unsaturated monomers, i.e., monomers containing hydroxyl and/or carboxyl groups (also amide and epoxy mentioned in U.S. Pat. No. 4,477,536) in amounts of about 10 to 90 percent by weight of such polymers. Such polar groups stabilize the crosslinked polymeric microparticles in the aqueous medium and the polar groups are also necessary to interact with one another and to form a spacial lattice which imparts thixotropy to the resultant coating composition. In the practice of the present invention, it has been found that such polar groups are not necessary to control the rheology of the coating composition into which they are incorporated. Also, such polar groups can pose problems in the preparation of the crosslinked microparticles. Coagulation during preparation of the latex can result. Also, microparticles with polar groups when incorporated into coating compositions can adversely affect the appearance of the resultant coating.

U.S. Pat. No. 4,563,372 discloses clear or colored organic solvent-based coating compositions containing crosslinked polymeric microparticles. The microparticles are prepared by emulsion polymerization techniques of ethylenically unsaturated monomer including at least one crosslinking monomer and have a refractive index which is equal to or close to that of the surrounding film-forming polymer. The crosslinked microparticles are prepared in the presence of a polyester emulsifier. Such emulsifiers are undesirable in that they result in a considerable amount of coagulum during the emulsion polymerization process. Using lower molecular weight surfactants as in the present invention results in a product with no coagulum.

U.S. Pat. No. 4,849,480 discloses so-called crosslinked polymeric microparticles which are prepared by polymerizing in aqueous medium a mixture of ethylenically unsaturated monomers including an alkylene glycol dimethacrylate or diacrylate and an allyl acrylate. The resulting polymer is only lightly crosslinked in that it has a measurable molecular weight of from 500,000 to 5,000,000 (measured by gel permeation chromatography using polymethyl methacrylate standard). Onto this polymer is grafted other acrylic monomers; grafting occurring through the allyl group in which the grafted chains have a weight average molecular weight of less than 20,000. The crosslinked microparticles of the present invention differ from those of U.S. Pat. No. 4,849,480 in that they have a considerable high degree of crosslinking being prepared from 20 to 70 percent by weight of crosslinking monomer as opposed to the 0.1 to 5 percent by weight disclosed in U.S. Pat. No. 4,849,480. Such higher degree of crosslinking is desirable for clean inversion into the non-aqueous medium. Lightly crosslinked microparticles can be swelled by non-aqueous medium leading to viscosity increases making conditions in the reactor difficult.

Also, the crosslinked microparticles of the present invention do not require a separate grafting step. Apparently, grafting is needed in U.S. Pat. No. 4,849,480 to recover the polymer microparticle from aqueous medium by azeotropic distillation techniques. As shown in Example 1 of the patent, without the subsequent grafting reaction, the polymer was precipitated from the aqueous emulsion to form a powder and the powder then dispersed in polar organic solvent to form the dispersion of the polymer microparticles for incorporation into the organic solvent-based coating composition. In the present invention, crosslinked polymeric microparticles can be prepared in aqueous medium and converted directly into a non-aqueous dispersion by inversion into organic diluent and azeotropic distillation for incorporation into an organic solvent-based coating composition without having to use a separate second stage graft polymerization.

U.S. Pat. No. 4,611,026 discloses crosslinked polymeric microparticles prepared by polymerizing by aqueous emulsion polymerization techniques an epoxy group-containing vinyl monomer along with other ethylenically unsaturated monomers in the presence of acid. The emulsion can be inverted into organic diluent and the water removed by azeotropic distillation. The crosslinked microparticles can be formulated into coating compositions where they improve the sag resistance and metallic pigment pattern control of the coating compositions. Although the reference mentions that glycol acrylates or methacrylates can be present with the other ethylenically unsaturated monomers, these monomers are not responsible for the crosslinking reaction. It is the epoxy monomer which must be present in an amount greater than 2 percent by weight based on total weight of monomers and the acid which cause the crosslinking.

European Patent 153,600 discloses crosslinked polymeric microparticles prepared by polymerizing by aqueous emulsion polymerization techniques a mixture of vinyl monomers including a vinyl silane monomer. The emulsion can be inverted into organic diluent and the water removed by azeotropic distillation. The crosslinked microparticles can be formulated into coating compositions where they improve the sag resistance and metallic pigment pattern control of the coating composition. Although the reference mentions that divinyl monomers such as glycol acrylates and glycol dimethacrylates can be present with the other ethylenically unsaturated monomers, these monomers are not responsible for the crosslinking reaction. It is the hydrolyzable vinyl silane monomer which causes the crosslinking.

SUMMARY OF THE INVENTION

In accordance with the present invention, polymeric microparticles useful as rheology control agents for coating compositions are provided. The microparticles are prepared initially in the form of an aqueous emulsion by aqueous emulsion polymerization techniques in the absence of polymeric emulsifiers from a mixture of polymerizable ethylenically unsaturated monomers being substantially free of monomers containing polar groups and at least one of said monomers being a polyethylenically unsaturated crosslinking monomer free of oxyethylene groups and present in amounts of 10 to 90, preferably 20 to 50, percent by weight based on total weight of the polymerizable ethylenically unsaturated monomers. The water is removed from the emulsion by azeotropic distillation with an organic diluent in which the crosslinked polymeric microparticles are insoluble and which forms an azeotrope with water to form a dispersion of the crosslinked polymeric microparticles in the organic diluent.

The invention also provides a process for preparing the crosslinked polymeric microparticles which involves the following steps:

(a) polymerizing via aqueous emulsion polymerization techniques in the absence of polyester emulsifiers a mixture of polymerizable ethylenically unsaturated monomers being substantially free of monomers containing polar groups and at least one of said monomers being a polyethylenically unsaturated crosslinking monomer free of oxyethylene groups and present in amounts of 10 to 90, preferably 20 to 50, percent by weight based on total weight of said ethylenically unsaturated monomers to form an aqueous emulsion of said crosslinked polymeric microparticles;

(b) inverting said aqueous emulsion into organic diluent in which the crosslinked polymeric microparticles are insoluble and which forms an azeotrope with water;

(c) heating the mixture formed in (b) to reflux; and (d) removing water from said mixture by azeotropic distillation to form a dispersion of the crosslinked polymeric microparticles in the organic diluent.

The invention also provides for coating compositions comprising film-forming synthetic resin and an organic solvent for said resin and from 0.5 to 25, preferably 1 to 15, percent by weight based on weight of resin solids in the coating composition of the crosslinked polymeric microparticles as described above.

The invention also provides for a process for applying the composite coating to a substrate which comprises applying to the substrate a colored film-forming composition to form a base coat and applying to said base coat a clear film-forming composition to form a transparent top coat over the base coat comprising as the clear film-forming composition and/or the colored film-forming composition the aforementioned coating composition.

DETAILED DESCRIPTION

The ethylenically unsaturated monomers which are polymerized are substantially free of polar groups such as hydroxyl groups, carboxyl groups, amide groups, epoxy groups, silane groups and other such polar groups. By substantially free of such polar groups is meant that if present at all such monomers will be present in amounts less than 2 percent by weight, preferably less than 1 percent by weight, based on total weight of ethylenically unsaturated monomers which are used in preparing the crosslinked polymeric microparticles.

Examples of such ethylenically unsaturated monomers are vinyl monomers such as esters of organic acids such as alkyl acrylates and alkyl methacrylates, for example, those containing from 1 to 18, preferably 1 to 6 carbon atoms in the alkyl group. These monomers will typically constitute up to 90 percent, and preferably from 25 to 75 percent by weight of the ethylenically unsaturated monomers, the percentage by weight being based on total weight of such monomers.

Also, polymerizable ethylenically unsaturated aromatic monomers such as styrene and alkyl-substituted styrene having 1 to 4 carbon atoms in the alkyl group can be used. Examples include alpha-methylstyrene, ethyl vinyl benzene and vinyl toluene. These monomers will typically constitute up to 90 and preferably 15 to 75 percent by weight of the ethylenically unsaturated monomers; the percentage by weight being based on total weight of such monomers.

Examples of other ethylenically unsaturated monomers are alpha-olefins such as ethylene and propylene, vinyl esters of organic acids such as vinyl acetate, vinyl propionate diene compounds such as butadiene and isoprene. When these other monomers are used, they are used in amounts up to 30 percent by weight.

Mixtures of the above-mentioned monomers can also be used.

In order to form a crosslinked microparticle, a polyethylenically unsaturated crosslinking monomer is used in the polymerization. The high degree of crosslinking in the microparticles of the present invention is due to the presence of such crosslinking monomer. The crosslinking monomers have at least two ethylenically unsaturated bonds in the molecule. Examples of such monomers are esters of a polyhydric alcohol and an ethylenically unsaturated monocarboxylic acid, esters of ethylenically unsaturated monoalcohol with a polycarboxylic acid and an aromatic compound having at least two vinyl substituents. Preferably, the crosslinking monomer is an ester of a polyhydric alcohol with an ethylenically unsaturated monocarboxylic acid such as a polyacrylate or polymethacrylate ester of an alkylene polyol having 2 to 3 hydroxyl groups and in which the alkylene group contains 2 to 8 carbon atoms.

Specific examples of polyethylenically unsaturated crosslinking monomers include ethylene glycol diacrylate, ethylene glycol dimethacrylate, triethylene glycol dimethacrylate, tetraethylene glycol dimethacrylate, trimethylolpropane triacrylate, trimethylolpropane trimethacrylate, pentaerythritol tetramethylacrylate, triallylisocyanurate, diallylphthalate and divinylbenzene. These monomers are present in amounts of from 10 to 90, preferably from 20 to 50 percent by weight based on total weight of the monomers used in preparing the crosslinked polymeric microparticles. Amounts less than 10 percent by weight are undesirable because of insufficient crosslinking and the problems associated with lightly crosslinked microparticles mentioned above, whereas amounts greater than 90 percent by weight are undesirable because of cleanliness due to coagulum formation during latex synthesis.

The ethylenically unsaturated monomers as described above are polymerized together by aqueous emulsion polymerization techniques. Such techniques are described, for example, in EMULSION POLYMERIZATION by D. C. Blackley, Halsted Press, a division of John Wiley & Sons, New York-Toronto, 1975. In conducting the emulsion polymerization, the mixtures of monomers is usually added slowly to a mixture of surfactant in water with agitation and under inert atmosphere. Polymerization is conducted in the presence of a free radical initiator in the aqueous medium with a mixture of monomers being in the dispersed phase.

Among the surfactants which may be used are anionic, cationic and non-ionic surfactants including mixtures of anionic and non-ionic and mixtures of cationic and non-ionic surfactants. Examples of anionic surfactants include alkali metal and ammonium salts of long chain alkyl sulfates, sulfonates and sulfosuccinates; alkali metal and ammonium phosphate esters and alkali metal and ammonium alkyl phenoxy polyethoxysulfates, sulfonates or phosphates in which the alkyl group contains 4 to 18 carbon atoms and the oxyethylene units range from 6 to 60.

Examples of specific anionic surfactants include sodium lauryl sulfate, sodium cetyl sulfate and ammonium nonylphenoxy (polyethoxy)$_{6\text{-}60}$ sulfonate.

Examples of cationic surfactants include quaternary ammonium salts such as tetramethyl ammonium chloride and ethylene oxide condensates of cocoamines.

Examples of non-ionic surfactants include alkylphenoxy polyethoxy ethanols having alkyl groups of from about 4 to 18 carbon atoms and 6 to 60 or more oxyethylene units such as octylphenoxy polyethoxy ethanol, nonylphenoxy (polyethoxy)$_{6\text{-}60}$ ethanol and dodecylphenoxy (polyethoxy)$_{6\text{-}60}$ ethanol. Also, ethylene oxide derivatives of long chain carboxylic acids such as lauric and oleic acid can be used as can ethylene oxide condensates of long chained alcohols such as octyl, decyl, lauryl or cetyl alcohol. Preferred surfactants are anionic surfactants such as ammonium alkylphenoxy polyethoxy sulfates.

The amount of surface active agent can vary in amounts up to 15 percent and preferably from about 2 to 10 percent, and more preferably from 4 to 7 percent by weight based on total weight of polymerizable ethylenically unsaturated monomers.

With regard to the free radical initiator, there may be used one or more peroxides which are preferably soluble in aqueous medium. Examples include persulfates such as ammonium, sodium and potassium persulfate, with ammonium persulfate being the most preferred. Perphosphates can also be used such as potassium perphosphate. Organic peroxides such as t-butylhydroperoxide and cumene hydroperoxide can be used as can hydrogen peroxide. The amount of free radical initiator required is usually from about 0.1 to 5, and preferably 0.2 to 3 percent by weight based on total weight of the polymerizable ethylenically unsaturated monomers.

Copolymerization is usually conducted at temperatures below about 90° C., preferably in the range of 25° to 80° C., although slightly lower and somewhat higher temperatures may be used. During the polymerization, the temperature can be controlled in part through the rate at which the monomers are supplied and polymerized and through applied heating and cooling.

The polymerization process can be carried out batchwise or continuously. It is possible to work entirely batchwise emulsifying the entire amount of monomers and proceeding with the polymerization. It is usually advantageous, however, to start with part of the monomers which are to be used and add more monomers as polymerization proceeds. An advantage of gradual addition of monomers lies in reaching high solids contents with optimum control and with maximum uniformity of product. Additional free radical initiator may also be added as polymerization proceeds.

The aqueous emulsions prepared in accordance with the invention contain discrete crosslinked polymeric microparticles. Usually the emulsion will have a resin solids content of from about 20 to 50 percent by weight, the percentage by weight being based on total weight of the emulsion. The crosslinked polymeric microparticles will have a particle size of 10 microns or less, preferably within the range of 0.005 to 10 microns, and more preferably 0.1 to 1 micron; the particle size being determined by light scattering techniques. The microparticles will be crosslinked or gelled as evidenced by their insolubility in acetone. When the crosslinked microparticles prepared in accordance with the invention are dried, placed in a Soxhlet extractor and extracted for 12 hours with acetone, at least 50 and preferably at least 65, more preferably at least 80, and most preferably at least 98 percent by weight of the microparticle is not extracted.

For formulation into organic solvent-based coating compositions, the aqueous emulsion of the crosslinked microparticles prepared as described above is inverted into organic solvent and the water removed by azeotropic distillation. Substantially all of the water is removed enabling the resulting dispersion to be mixed with the appropriate organic solvent-based coating compositions.

The aqueous microgel emulsion may be azeotropically distilled using any organic diluent which forms an azeotrope with water. Typical diluents include aromatics such as xylene and toluene; higher boiling aliphatics such as nonane and decane; ketones such as methyl amyl ketone, methyl isobutyl ketone; and alcohols such as butanol, hexanol and amyl alcohol.

The preferred solvent is an ester of the structure:

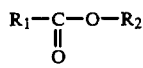

where $R_1$ is an alkyl of from 1 to 6 carbon atoms either straight or branched chain and $R_2$ is an alkyl of from 1 to 13 carbon atoms either straight or branched chain, and preferably $R_1$ and $R_2$ together contain from 6 to 17 carbon atoms. Mixtures of the various esters having the above structure can also be used. Examples of such esters are hexyl acetate, heptyl acetate, pentyl propionate, isobutyl isobutyrate, methyl pentanoates and ethyl hexanoates. Such esters are preferred because of ease of water removal without viscosity increase and reactor build up. Mixtures of organic diluents can also be used.

The amount of diluent used can be varied but should be enough to facilitate azeotropic removal of water with substantially all the water being removed from the microgel emulsion. The aqueous emulsion is inverted into the azeotropic solvent and the mixture heated for azeotropic distillation. In certain instances, i.e., when using esters of polyhydric alcohols and ethylenically unsaturated monocarboxylic acids, the mixture can be heated to reflux for an extended period of time prior to azeotropic distillation. Preferably, the mixture is heated at reflux for at least 2 hours and preferably 6 hours prior to removal of water by azeotropic distillation. This digestion phase is preferred because it avoids reactor build up and results in smoother inversion into the non-aqueous medium.

After the water has been removed resulting in a non-aqueous dispersion of the crosslinked polymeric microparticles, the particles can be incorporated into organic diluent-based coating compositions by simple mixing procedures.

The microparticles can be used in a variety of organic solvent-based coating compositions in additive amounts of about 0.5 to 25, preferably 1 to 15 percent by weight based on weight of resin solids in the coating composition.

Typical high solids coating compositions at which the crosslinked polymeric microparticles are used have a resin solids content of about 40 to 90 percent by weight and usually from about 50 to 80 percent by weight. The composition also contains from about 5 to 60, usually 20 to 50, percent by weight of an organic liquid diluent which can be either a solvent for the binder or a non-solvent in which case the resinous binder is dispersed in the organic diluent. The coating composition can be a clear, i.e., forms a substantially transparent coating or can contain a coloring pigment.

Typical high solids coating compositions, in which the crosslinked microparticles can be used, have as the film-forming constituents the following: acrylic polymers with reactive groups such as hydroxyl, carboxyl or glycidyl and a crosslinking agent such as an aminoplast resin, a polyisocyanate, a polyepoxide or a polyacid.

Hydroxyl-terminated polyester resins and the aforementioned aminoplast or polyisocyanate curing agents, blends of hydroxyl-containing acrylic resins and hydroxyl-containing polyester resins and the aforementioned aminoplast or polyisocyanate curing agents, alkyd resins with or without drying oil groups which can optionally be blended with aminoplast or polyisocyanate curing agents can also be used as the film-forming constituents.

Besides the crosslinked polymeric microparticles, resinous binder and organic diluent, the coating compositions can optionally contain pigments which may be any of the pigments conventionally used for surface coating including inorganic pigments such as titanium dioxide, iron oxide, chromium oxide, lead chromate and carbon black, and organic pigments such as phthalocyanine blue and phthalocyanine green, carbazole violet, anthrapyrimidine yellow, flavanthrone yellow, isoindoline yellow, indanthrone blue, quinacridone violet and perylene reds. For the present purposes, the term "pigment" is here meant to embrace also conventional fillers and extenders such as talc or kaolin. The composition can also contain metallic pigments such as aluminum flake and metal oxide coated micas. In general, when pigments are incorporated in the composition, they are incorporated in amounts of about 1 to 30 percent by weight based on total weight of coating solids.

Such pigments whether metallic or otherwise are usually incorporated into the coating composition with the aid of pigment dispersants. Thus, in the case where the main film-forming polymer is of the acrylic type, an acrylic polymer of similar composition may be employed as a pigment dispersant.

The coating compositions may additionally incorporate other known additives, for example, UV light stabilizers, anti-oxidants, catalysts and other additives well known in the coatings art.

The coating compositions can be applied over a variety of substrates such as metal, wood, glass, plastics and the like by any of the conventional application methods such as spraying, electrostatic spraying, dipping, brushing, flow coating and the like. After application, the resultant coating is baked at temperatures of about 110° to 180° C. for about 10 minutes to 1 hour to cure the coating. The resulting finish typically is about 0.5 to 2.0 mils thick.

Another aspect of the invention is to utilize the coating compositions containing the crosslinked polymeric microparticles as either the clear coat or the color coat or both the clear and color coat of a composite color plus clear coating. The clear coat is a transparent film of the coating composition described above and the color coat contains the coloring pigments mentioned above with a pigment to binder weight ratio of about 0.01 to 125:1. The color-clear composite coating is applied to the substrate by conventional spraying techniques and preferably the clear coat is applied to the color coat while the color coat is still wet.

The following examples illustrate the invention and all parts and percentages are on a weight basis unless otherwise indicated.

EXAMPLES

The following examples show the preparation of discrete polymeric microgel particles. A mixture of vinyl monomers including difunctional crosslinker is polymerized by aqueous emulsion polymerization techniques. After completion of the polymerization, the emulsion is inverted to an organic solvent by azeotropic distillation at low pressure. For the purposes of comparison, three microgels were prepared, one in accordance with U.S. Pat. No. 4,563,372 and two examples each using 10 percent of a monomer containing polar groups, i.e., hydroxyethyl acrylate and methacrylic acid, respectively. The use of monomers containing such polar groups is taught in U.S. Pat. No. 4,377,661. Also for the purpose of comparison, a microgel emulsion was prepared in accordance with U.S. Pat. No. 4,377,661 and inverted into organic solvent in accordance with Examples 2 and 5 of U.S. Pat. No. 4,377,661.

EXAMPLE 1

In this example, the following initial charge and feeds were used in the polymerization and inverting the resultant aqueous emulsion to a non-aqueous dispersion.

| Ingredients | Parts by Weight |
|---|---|
| Charge 1 | |
| Deionized water | 181.80 |
| ALIPAL CO-436[1] | 1.27 |
| Charge 2 | |
| Methyl mathacrylate | 2.76 |
| Butyl acrylate | 2.97 |
| Charge 3 | |
| Deionized water | 2.12 |
| Charge 4 | |
| Deionized water | 1.83 |
| Ammonium persulfate | 0.36 |
| Charge 5 | |
| Deionized water | 1.06 |
| Charge 6[2] | |
| Styrene | 38.30 |
| Methyl methacrylate | 19.20 |
| Butyl acrylate | 19.20 |
| Ethyleneglycol dimethacrylate | 50.90 |
| ALIPAL CO-436 | 9.90 |
| Deionized water | 80.00 |
| Charge 7 | |
| Deionized water | 23.40 |
| Ammonium persulfate | 0.25 |
| Sodium tetraborate decahydrate | 0.06 |
| Charge 8 | |
| Deionized water | 5.30 |
| Charge 9 | |
| Deionized water | 6.40 |
| Charge 10 | |
| EXXATE-600[3] | 301.30 |

[1]Ammonium salt of ethoxylated nonyl phenol sulfate (58.0% active), available from GAF Corporation.
[2]Charge 6 was pre-emulsified by adding the mixture of vinyl monomers to an agitated solution of the surfactant and the deionized water.
[3]Hexyl acetate, available from Exxon Chemical Company.

The initial charge (Charge 1) was heated to a temperature of 80° C. under a nitrogen blanket and with agitation in a reaction vessel suitable for aqueous emulsion polymerization and azeotropic distillation at low pressure. Charges 2 and 3 were added to the reaction vessel and the temperature held for 5 minutes at 80° C. followed by the addition of Charges 4 and 5 and holding the reaction mixture temperature at 80° C. for 30 minutes. The pre-emulsified monomer mixture (Charge 6) and Charge 7 were added to the reaction mixture simultaneously over a 3-hour period while maintaining the reaction mixture temperature at about 80° C. At the completion of addition, the addition funnels were rinsed with Charges 8 and 9, and the reaction mixture was held for 2 hours at 80° C. to complete the polymerization. The reaction mixture was heated to reflux and inverted into organic diluent upon adding Charge 10 to the reaction mixture over a 0.5-hour period. After holding the reaction mixture 8 hours at reflux temperature (99° C.), it was cooled to 65° C. and dehydrated by azeotropic distillation at 44°–68° C. and 75–150 mm Hg pressure. The product was filtered to yield a bluish colored dispersion with a resin content of 30.4 percent, a viscosity of 88 centipoise (Brookfield #1 at 30 rpm), and a water content of 0.074 percent. The particle size was 1800 Angstroms.

EXAMPLE 2

The following example shows the preparation of microgel particles by aqueous emulsion polymerization techniques in a manner similar to that of Example 1 but in which the reaction mixture was not aged before azeotropic distillation at low pressure. The following reaction charges were used in the polymerization and inverting aqueous emulsion to a non-aqueous dispersion.

| Ingredients | Parts by Weight |
|---|---|
| Charge 1 | |
| Deionized water | 169.10 |
| SIPONATE DS-4[1] | 3.11 |
| Charge 2 | |
| Methyl methacrylate | 2.69 |
| Butyl acrylate | 2.83 |
| Charge 3 | |
| Deionized water | 2.00 |
| Charge 4 | |
| Deionized water | 1.70 |
| Ammonium persulfate | 0.34 |
| Charge 5 | |
| Deionized water | 2.00 |
| Charge 6[2] | |
| Styrene | 29.30 |
| Methyl methacrylate | 16.30 |
| Butyl acrylate | 16.30 |
| Divinylbenzene[3] | 59.60 |
| SIPONATE DS-4 | 28.70 |
| Deionized water | 76.10 |
| Charge 7 | |
| Deionized water | 27.30 |
| Ammonium persulfate | 0.24 |
| Sodium tetraborate decahydrate | 0.06 |
| Charge 8 | |
| Deionized water | 3.00 |
| Charge 9 | |
| Deionized water | 2.00 |
| Charge 10 | |
| EXXATE-600 | 273.90 |

[1]Sodium dodecylbenzene sulfonate (23.0% active), available from Alcolac.
[2]Charge 6 was pre-emulsified by adding the mixture of vinyl monomers to an agitated solution of the surfactant and the deionized water.
[3]A mixture of meta plus para divinylbenzene (55.5%) and meta plus para ethylvinylbenzene (42.0%), available from Dow Chemical Co.

The initial charge (Charge 1) was heated to a temperature of 80° C. under nitrogen blanket and with agitation in a reaction vessel suitable for aqueous emulsion polymerization and azeotropic distillation at low pressure. After holding at 80°-82° C. for 15 minutes, Charges 2 and 3 were added to the reaction vessel and the temperature held for 5 minutes at 81° C. followed by the addition of Charges 4 and 5. The temperature of the reaction mixture was held between 80°-81° C. for 30 minutes. Charges 6 and 7 were added simultaneously to the reaction mixture over a 3-hour period while maintaining the temperature of the reaction mixture at 80° C. At the completion of the additions of Charges 6 and 7, the addition funnels were rinsed with Charges 8 and 9, and the reaction mixture was held at 81° C. for 2 hours to complete the polymerization. Charge 10 was added to the reaction vessel over 45 minutes to invert the aqueous emulsion into organic diluent. The reaction mixture was dehydrated by azeotropic distillation at low pressure. The product was filtered to yield a bluish colored dispersion with a resin content of 33.5 percent, a viscosity of 40 centipoise (Brookfield #2 at 50 rpm), and a water content of 0.064 percent. The particle size was 1200 Angstroms.

COMPARATIVE EXAMPLE 3

For the purpose of comparison, a microgel was prepared generally in accordance with U.S. Pat. No. 4,563,372. This microgel was prepared by polymerizing the mixture of acrylic monomers in Example 1 above in aqueous medium at 30 percent resin solids by replacing the surfactant of Example 1 with a polyester emulsifier as described generally in U.S. Pat. No. 4,563,372. Also, the ammonium persulfate initiator was replaced with 4,4'-azobis-(4-cyanovaleric acid). The microgel was prepared as follows:

| Ingredients | Parts by Weight |
|---|---|
| Charge 1 | |
| Deionized water | 580.00 |
| Polyester emulsifier | 10.00 |
| Charge 2 | |
| Dimethylethanolamine | 0.75 |
| Charge 3 | |
| 4,4'-azobis-(4-cyanovaleric acid) | 4.50 |
| Dimethylethanolamine | 4.30 |
| Deionized water | 45.00 |
| Charge 4 | |
| Methyl methacrylate | 44.40 |
| Butyl acrylate | 44.80 |
| Styrene | 77.70 |
| Ethyleneglycol dimethacrylate | 103.10 |
| Charge 5 | |
| 4,4'-azobis-(4-cyanovaleric acid) | 1.50 |
| Dimethylethanolamine | 1.40 |
| Deionized water | 15.00 |

To a two-liter, three-neck reaction flask equipped with a condenser, thermocouple and agitator, Charge 1 was added and heated to 80° C. Charge 2 was added to the reaction flask and the mixture was stirred 15 minutes at 80° C. to make a solution. Charge 3 was added to the reaction mixture and followed by the addition of Charge 4 over a 60-minute period while maintaining the reaction temperature at 80° C. After adding about one-half of Charge 4 to the reaction mixture, it became too viscous and flocculated.

COMPARATIVE EXAMPLE 4

The following example shows the preparation of microgel particles by aqueous emulsion polymerization technique in a manner similar to that of Example 1 with the exception that the monomer mixture contained 2-hydroxyethyl acrylate as a comonomer. The following reaction charges were used in the polymerization:

| Ingredients | Parts by Weight |
|---|---|
| Charge 1 | |
| Deionized water | 1927.50 |
| ALIPAL CO-436 | 13.5 |
| Charge 2 | |
| Methyl methacrylate | 29.30 |
| Butyl acrylate | 31.50 |
| Charge 3 | |
| Deionized water | 22.50 |
| Charge 4 | |
| Deionized water | 19.50 |
| Ammonium persulfate | 3.75 |
| Charge 5 | |
| Deionized water | 11.25 |
| Charge 6[1] | |
| Styrene | 406.80 |
| Methyl methacrylate | 68.00 |
| Butyl acrylate | 203.25 |
| Ethyleneglycol dimethacrylate | 540.00 |
| 2-Hydroxyethyl acrylate | 135.30 |
| ALIPAL CO-436 | 105.00 |
| Deionized water | 847.50 |
| Charge 7 | |
| Deionized water | 247.50 |
| Ammonium persulfate | 2.70 |
| Sodium tetraborate decahydrate | 0.60 |
| Charge 8 | |
| Deionized water | 56.30 |
| Charge 9 | |
| Deionized water | 68.30 |

[1]Charge 6 was pre-emulsified by adding the mixture of vinyl monomers to an agitated solution of the surfactant and the deionized water.

The initial charge (Charge 1) was heated to a temperature of 85° C. under a nitrogen blanket and with agitation in a reaction vessel suitable for aqueous emulsion polymerization. Charges 2 and 3 were added to the reaction vessel and the temperature held for 5 minutes at 85° C. followed by the addition of Charges 4 and 5. The temperature of the reaction mixture was held at 85° C. for 30 minutes. Charges 6 and 7 were added simultaneously to the reaction mixture over a 3-hour period while maintaining the temperature of the reaction mixture at 85° C. At the completion of the additions of Charges 6 and 7, the addition funnels were rinsed with Charges 8 and 9, and the reaction mixture was held at 85° C. for 2 hours to complete the polymerization. The reaction mixture suddenly flocculated toward to the end of holding time.

COMPARATIVE EXAMPLE 5

The following example shows the preparation of microgel particles by aqueous emulsion polymerization technique in a manner similar to that of Example 1 with the exception that the monomer mixture contained 10 percent methacrylic acid as a comonomer. The following reaction charges were used in the polymerization:

| Ingredients | Parts by Weight |
|---|---|
| Charge 1 | |
| Deionized water | 1927.50 |

-continued

| Ingredients | Parts by Weight |
|---|---|
| ALIPAL CO-436 | 13.50 |
| *Charge 2* | |
| Methyl methacrylate | 29.30 |
| Butyl acrylate | 31.50 |
| *Charge 3* | |
| Deionized water | 22.50 |
| *Charge 4* | |
| Deionized water | 19.50 |
| Ammonium persulfate | 3.75 |
| *Charge 5* | |
| Deionized water | 11.25 |
| *Charge 6[1]* | |
| Styrene | 406.80 |
| Methyl methacrylate | 68.00 |
| Butyl acrylate | 203.25 |
| Ethyleneglycol dimethacrylate | 540.00 |
| Methacrylic acid | 135.30 |
| ALIPAL CO-436 | 105.00 |
| Deionized water | 847.50 |
| *Charge 7* | |
| Deionized water | 247.50 |
| Ammonium persulfate | 2.70 |
| Sodium tetraborate decahydrate | 0.60 |
| *Charge 8* | |
| Deionized water | 56.30 |
| *Charge 9* | |
| Deionized water | 68.30 |

[1]Charge 6 was pre-emulsified by adding the mixture of vinyl monomers to an agitated solution of the surfactant and the deionized water.

The initial charge (Charge 1) was heated to a temperature of 85° C. under a nitrogen blanket and with agitation in a reaction vessel suitable for aqueous emulsion polymerization. Charges 2 and 3 were added to the reaction vessel and the temperature held for 5 minutes at 86° C. followed by the addition of Charges 4 and 5. The temperature of the reaction mixture was held at 85° C. for 30 minutes. The 3-hour feeding of Charges 6 and 7 were started simultaneously at a temperature of 85° C. The reaction mixture suddenly flocculated toward to the end of feeding time.

COMPARATIVE EXAMPLE 6

For the purpose of comparison, a microgel emulsion was prepared and inverted to organic solvent mixture in accordance with Examples 2 and 5 of U.S. Pat. No. 4,377,661. The microgel was prepared as follows:

| Ingredients | Parts by Weight | Percent by Weight |
|---|---|---|
| *Charge 1* | | |
| AEROSOL 18[1] | 105.00 | 3.00 |
| AEROSOL AY-65[2] | 52.50 | 1.50 |
| Deionized water | 1758.75 | 50.25 |
| Sodium bicarbonate | 8.75 | 0.25 |
| *Charge 2* | | |
| Ammonium persulfate | 8.75 | 0.25 |
| Deionized water | 516.25 | 14.75 |
| *Charge 3* | | |
| Hydroxypropyl methacrylate | 105.00 | 3.00 |
| 2-Ethylhexyl acrylate | 735.00 | 21.00 |
| Divinylbenzene | 210.00 | 6.00 |

[1]Disodium N-octadecyl sulfosuccinamate (35.0% active), available from American Cyanamid Co.
[2]Sodium diamyl sulfosuccinamate (65.0% active), available from American Cyanamid Co.

To a five-liter, three-neck reaction flask equipped with a condenser, thermocouple and agitator, Charge 1 was added and heated to 87° C. at which time 10 percent of Charge 2 was added. After holding the reaction mixture 30 minutes at 87° C., Charge 3 was added to the reaction flask continuously over 2.5 hours. At the same time, the remaining ammonium persulfate solution from Charge 2 was added continuously over 3 hours. The temperature of the reaction was held at 87° C. throughout the monomer addition. Thirty minutes after the ammonium persulfate solution was added, the emulsion was cooled to room temperature and filtered.

The aqueous emulsion prepared as described above was inverted with organic solvent and water removed by azeotropic distillation as follows:

| Ingredients | Parts by Weight |
|---|---|
| Aqueous emulsion | 626.00 |
| n-Butanol | 950.00 |
| Xylene | 50.00 |

The charge was added to a reaction vessel equipped with mechanical agitation, a thermocouple, a Dean-Stark trap, and reflux condenser. The charge was heated to reflux temperature under atmospheric pressure for azeotropic distillation. The distillate collected to the Dean-Stark trap consisted of two layers. The aqueous bottom layer was removed during the course of the distillation, while the top layer was continuously returned to the flask. The distillation was stopped when the temperature of the mixture reached to 100° C. and held at that temperature for an hour. The mixture was cooled to room temperature and filtered. Filtration through 106 micrometer sieve was difficult because of the presence of large amount of coagulated particles.

COMPARATIVE EXAMPLE 7

A clear coat formulation containing no crosslinked polymeric microparticles was prepared from the following mixture of ingredients:

| | Parts by Weight | |
|---|---|---|
| Ingredients | Solids | Total |
| TINUVIN 440[1] | 0.7 | 0.7 |
| Xylene | — | 15 |
| SOLVESSO 100[2] | — | 15 |
| TINUVIN 328[3] | 3.1 | 3.1 |
| Aminoplast[4] | 20.0 | 20.0 |
| Acrylic polymer[5] | 32.0 | 43.8 |
| Polyester polymer[6] | 23.0 | 25.6 |
| n-propanol | — | 12.3 |
| Flow control agent[7] | 0.25 | 0.5 |
| Catalyst[8] | 1.0 | 3.5 |
| Aminoplast[9] | 25.0 | 25.0 |

[1]Hindered amine light stabilizer available from Ciba-Geigy Corporation.
[2]Aromatic hydrocarbon solvent available from Exxon Chemical Company.
[3]Substituted benzotriazole UV light stabilizer available from Ciba-Geigy.
[4]Aminoplast available from American Cyanamid Co. as CYMEL 1168.
[5]Acrylic polymer dissolved in hexyl acetate, mineral spirits mixture (87/13 weight ratio) prepared from 47.8% butylmethylacrylate, 28.7% hydroxyethylacrylate, 20.5% methyl methacrylate, 2% acrylic acid and 1% alpha-methylstyrene dimer. The polymer had an Mn of about 2600 and an Mw of about 6000.
[6]A polyester dissolved in xylene prepared from condensing neopentyl glycol and hexhydrophthalic anhydride having a hydroxyl value of 271 and an acid value of 7.93.
[7]A 50% solution of ethyl acrylate and ethylhexylacrylate copolymer in xylene available from Monsanto Company as MULTIFLOW.
[8]Dinonyl naphthalene disulfonic acid 50 percent neutralized with diisopropanolamine.
[9]Aminoplast available from American Cyanamid Co. as CYMEL 1131.

The above ingredients were mixed together in the order indicated with low shear mixing to form a clear coating composition.

Additional clear coat compositions containing crosslinked polymeric microparticles were prepared by mixing the following polymeric microparticle dispersions into the clear coating composition of Comparative Example 7 by replacing 3 parts by solid weight of the polyester polymer with the crosslinked polymeric microparticles.

EXAMPLE 8

| Ingredients | Parts by Weight | |
|---|---|---|
| | Solids | Total |
| Crosslinked polymeric microparticles of Example 1 | 3.0 | 10.0 | compositions were Example 12, Comparative Example 13 and Example 14, respectively. The base coat and clear coat formulations described above were then applied as color/clear composite coatings.

The coatings were applied at 75° F. (24° C.). The base coat was spray applied in two passes with a 90-second flash between coats. After another 90-flash, the clear coat was spray applied in two passes with a 90-second flash between coats. The composite coating was then given a 5-minute flash and heat cured in an oven at 285° F. (141° C.) for 25 minutes. The composite coatings were evaluated for film thickness, distinctness of image, hardness, solvent resistance and chip resistance. The results are reported in Table I below:

TABLE I

Properties of Color/Clear Composite Coatings of Examples 7-14

| Clear Coat of Ex./ Base Coat of Ex. | Clear Coat Thickness in mils | Base Coat Thickness in mils | Horizontal[1] | | Vertical[4] | | Tukon Hardness[5] | Xylene Resistance[6] | Chip Resistance[7] | Horizontal[1] Visual Rating[8] | Vertical[4] Visual Rating[8] |
|---|---|---|---|---|---|---|---|---|---|---|---|
| | | | 20° Gloss[2] | DOI[3] | 20° Gloss | DOI | | | | | |
| 8/11 | 1.81 | 0.82 | 95 | 88 | 94 | 75.3 | 9.55 | OK | 7− | 2 | 5 |
| 8/12 | 1.87 | 0.66 | 96 | 84 | 93 | 77.9 | 8.86 | OK | 7− | 4 | 4 |
| 8/13 | 1.74 | 0.64 | 94 | 84.8 | 94 | 76.6 | 9.25 | OK but scratched | 5 | 7 (dark base coat) | 6 (dark base coat) |
| 8/14 | 1.79 | 0.68 | 95 | 87.5 | 94 | 79.4 | 9.55 | OK | 5 | 3 | 1 |
| 7/11 | 1.70 | 0.76 | 95 | 88.2 | 94 | 63.3 | 8.61 | OK | 7− | 1 | 7 (wrinkled appearance) |
| 9/11 | 1.64 | 0.74 | 95 | 83.9 | 94 | 75.5 | 8.83 | OK but dull | 7− | 6 | 2 |
| 10/11 | 1.79 | 0.72 | 96 | 88 | 95 | 79.4 | 9.40 | OK | 7− | 5 (yellow) | 3 |

[1] For horizontal measurements and evaluations, color/clear composite coatings were spray applied to a vertical surface (90° from horizontal) and the coated surface cured horizontally.
[2] 20° Gloss measured with a 20° gloss meter available from Hunter Laboratories.
[3] DOI (Distinctness Of Image) determined by the DORI-GON meter D-47-6 available from Hunter Laboratories.
[4] For vertical measurements and evaluations, color/clear composite coatings were spray applied to a vertical surface.
[5] Tukon hardness number determined by ASTM E-48.
[6] Xylene resistance determined by placing two drops of xylene on a panel for three minutes. The pencil hardness of the spot in contact with the xylene is then determined. How much the coating softens compared to the original pencil hardness is a measure of the xylene resistance. When an evaluation of OK is given, there is no change in pencil hardness values.
[7] Chip resistance is determined by the gravelometer test in which one pint of gravel obtained from General Motors Corporation is sprayed at 70 pounds per square inch at test panels having a temperature of −10° F. and thereafter the composite coating on the panel is checked for chipping. A score of 10 indicates no chipping and a score of 0 indicates massive chipping.
[8] Visual ratings are on a subjective basis evaluating the wet look of the clear coat, the lightness of face of the base coat and the wrinkled appearance and yellowness of the clear coat as noted. A rating is given from 1 to 7 with 1 having the best overall appearance and 7 having a poor appearance.

COMPARATIVE EXAMPLE 9

| Ingredients | Parts by Weight | |
|---|---|---|
| | Solids | Total |
| Crosslinked polymeric microparticles of Comparative Example 6 | 3.0 | 18.9 |

EXAMPLE 10

| Ingredients | Parts by Weight | |
|---|---|---|
| | Solids | Total |
| Crosslinked polymeric microparticles of Example 2 | 3.0 | 9.0 |

A series of silver metallic base coats were prepared. The first base coat (Comparative Example 11) was that available from PPG Industries, Inc. as HUBC 33600. This base coat formulation contained about 12 percent by weight based on solids weight of crosslinked polymeric microparticles prepared in accordance with the teachings of U.S. Pat. No. 4,147,688.

Other base coat compositions were formulated by replacing on a weight basis the crosslinked microparticles present in Comparative Example 11 with the crosslinked polymeric microparticles of Example 1, Comparative Example 6 and Example 2. These other base coat The sag resistance of Comparative Example 7, Example 8, Comparative Example 9 and Example 10 was evaluated. Each of the clear coat compositions was applied directly to a 4 inches ×18 inches primed steel panel containing holes one inch apart in the center of the panel along its major dimension. The clear coat composition was spray applied to the panel which was disposed vertically along its major dimension in a film thickness ladder from approximately 0.6 mil to 3.0 mils. The films were given a 5-minute room temperature flash and then baked in a heating oven at 285° F. (141° C.) for 25 minutes. The holes in the panel are the site where vertical sag occurs. The film thickness at which a substantial sag occurs is recorded as the sag film thickness. The results are reported in Table II below.

TABLE II

| | Sag Film Thickness | | |
|---|---|---|---|
| Clear Coat Composition of Example | Viscosity of Clear Coat Compositions No. 4 Ford Cup (seconds) | Sag Film Thickness (mils) | Microgel Contained in Clear Coat Composition (% by weight based on weight of resin solids) |
| 7 | 19.8 | 1.1 | Control (0%) |
| 8 | 19.2 | 1.4 | Ex. 1 (3%) |
| 9 | 20.0 | 1.6 | Comp. 6 (3%) |
| 10 | 20.7 | 1.7 | Ex. 2 (3%) |

The data in Tables I and II above show that the base coat compositions containing the crosslinked polymeric microparticles prepared in accordance with the invention (Examples 12 and 14) provide better appearance in color/clear composite coatings than the base coat containing the crosslinked polymeric microparticles prepared in accordance with the procedures of U.S. Pat. No. 4,377,661 (Comparative Example 13). The clear coat compositions containing the crosslinked polymeric microparticles prepared in accordance with the invention (Examples 8 and 10) have better sag resistance than the control (Example 7) and somewhat better xylene resistance than the clear coat containing the polymeric microparticles prepared in accordance with the procedures of U.S. Pat. No. 4,377,661 (Comparative Example 9).

We claim:

1. Crosslinked polymeric microparticles useful as rheology control agents for coating compositions, said microparticles being prepared by aqueous emulsion polymerization techniques in the presence of a free radical initiator which is soluble in aqueous medium in the absence of polyester emulsifiers from a mixture of polymerizable ethylenically unsaturated monomers containing less than 1 percent by weight of monomers containing polar groups and at least one of said monomers being a polyethylenically unsaturated crosslinking monomer free of oxyethylene groups and present in amounts of 20 to 50 percent by weight based on total weight of said polymerizable ethylenically unsaturated monomers; removing water from the resulting emulsion by azeotropic distillation with an organic diluent in which the crosslinked polymeric microparticles are insoluble and which forms an azeotrope with water to form a dispersion of the crosslinked polymeric microparticles having a particle size within the range of 0.005 to 1 micron and which are crosslinked to an extent of at least 80 percent by weight in the organic diluent.

2. The crosslinked polymeric microparticles of claim 1 in which said microparticles are prepared by aqueous emulsion polymerization techniques in the presence of an ammonium salt of ethoxylated alkyl phenol sulfate.

3. The crosslinked polymeric microparticles of claim 2 in which the ammonium salt is of ethoxylated nonyl phenol sulfate.

4. The crosslinked polymeric microparticles of claim 1 in which the ethylenically unsaturated monomers other than said crosslinking monomer are selected from the class consisting of alkyl acrylates, alkyl methacrylates and polymerizable ethylenically unsaturated aromatic monomers and mixtures of said monomers.

5. The crosslinked polymeric microparticles of claim 4 in which the ethylenically unsaturated monomers are selected from the class consisting of alkyl acrylates having 1 to 6 carbon atoms in the alkyl group; alkyl methacrylates having 1 to 6 carbon atoms in the alkyl group; styrene and alkyl-substituted styrenes having 1 to 4 carbon atoms in the alkyl group and mixtures of said monomers.

6. The crosslinked polymeric microparticles of claim 1 in which the crosslinking monomer is an ester of a polyhydric alcohol and an ethylenically unsaturated monocarboxylic acid.

7. The crosslinked polymeric microparticles of claim 6 in which the crosslinking monomer is a polyacrylate or polymethacrylate ester of an alkylene polyol having 2 to 3 hydroxyl groups and in which the alkylene group contains 2 to 8 carbon atoms.

8. A process for preparing crosslinked polymeric microparticles comprising:
   (a) polymerizing via aqueous emulsion polymerization techniques in the presence of a free radical initiator which is soluble in the aqueous medium in the absence of polyester emulsifiers a mixture of polymerizable ethylenically unsaturated monomers containing less than 1 percent by weight of monomers containing polar groups and at least one of said monomers being a polyethylenically unsaturated crosslinking monomer free of oxyethylene groups and present in amounts of 20 to 50 percent by weight; the percentages based on total weight of said ethylenically unsaturated monomers to form an aqueous emulsion of said crosslinked polymeric microparticles;
   (b) inverting said aqueous emulsion into organic diluent in which the crosslinked polymeric microparticles are insoluble and which forms an azeotrope with water;
   (c) heating the mixture formed in (b) to reflux; and
   (d) removing water from said mixture by azeotropic distillation to form a dispersion of the crosslinked polymeric microparticles having a particle size within the range of 0.005 to 1 micron and which are crosslinked to an extent of at least 80 percent by weight in the organic diluent.

9. The process of claim 8 in which the organic diluent has the structure:

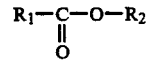

wherein $R_1$ is an alkyl group of from 1 to 6 carbon atoms and $R_2$ is an alkyl group of from 1 to 13 carbon atoms.

10. The process claim 9 in which the organic diluent is hexylacetate.

11. The process of claim 9 in which the mixture is held at reflux for at least 6 hours prior to removing water by azeotropic distillation.

12. A coating composition comprising a film-forming synthetic resin and an organic solvent for said resin and from 1 to 15 percent by weight based on weight of resin solids in said coating composition of the crosslinked polymeric microparticles of claim 1.

13. The coating composition of claim 12 which further comprises a pigment.

14. The coating composition of claim 12 which is a clear coating composition being substantially free of pigment.

15. A process for applying a composite coating to a substrate which comprises applying to the substrate a colored film-forming composition to form a base coat and applying to said base coat a clear film-forming composition to form a transparent top coat over the base coat comprising as the clear film-forming composition and/or as the colored film-forming composition the coating composition of claim 12.

* * * * *